United States Patent [19]
Azuchi

[11] Patent Number: 4,774,490
[45] Date of Patent: Sep. 27, 1988

[54] ROTARY ELECTRIC DEVICES

[75] Inventor: Yukihiro Azuchi, Sabae, Japan

[73] Assignee: Murata Manufacturing Co., Ltd., Japan

[21] Appl. No.: 682,932

[22] Filed: Dec. 18, 1984

[30] Foreign Application Priority Data

Jan. 4, 1984 [JP] Japan .................................. 59-145

[51] Int. Cl.⁴ ............................................. H01C 10/30
[52] U.S. Cl. .................................... 338/160; 338/161; 338/163; 338/184
[58] Field of Search ............... 338/160, 161, 163, 164, 338/166, 184, 193, 199

[56] References Cited

U.S. PATENT DOCUMENTS 4,390,859  6/1983  Kasprzyk et al. .............. 338/163 X

FOREIGN PATENT DOCUMENTS

58-72353  4/1983  Japan .

Primary Examiner—Clifford C. Shaw
Assistant Examiner—M. M. Lateef
Attorney, Agent, or Firm—Ostrolenk, Faber, Gerb & Soffen

[57] ABSTRACT

In a rotary electric device such as a trimmer capacitor or a variable resistor comprising a rotor contained in a case which is provided with an opening for receiving a screwdriver for rotating the rotor from the outside with a clearance being defined between an edge defining the opening and the rotor, a cover sheet is formed in a state covering the clearance and bonded to both of the case and the rotor, whereby the rotary electric device is closed. When the rotor is rotated in an adjusting stage, the cover sheet is readily broken and respective broken and separated parts of the cover sheet are individually retained by the case and the rotor.

23 Claims, 5 Drawing Sheets

ROTARY ELECTRIC DEVICES

BACKGROUND OF THE INVENTION

The present invention relates to a rotary electric device which comprises a rotary mechanism portion including rotor means and stator means contained in a case, and more particularly, it relates to an improvement in a closed type rotary electric device. Examples of such a rotary electric device are a trimmer capacitor, a variable resistor, a variable coil and a rotary switch etc., and the present invention may be applied to any of these rotary electric devices.

A rotary electric device comprises a rotary mechanism portion including a rotor means and a stator means contained in a case. In such a rotary electric device, the rotor means is rotated to change, e.g., the capacity in a trimmer capacitor and the resistance value in a variable resistor. Therefore, the case of the rotary electric device is provided with an opening for performing desired adjustment by changing characteristics of the rotary electric device from the exterior thereof, wherefore the rotor means is rotated through the opening.

Generally when a rotary electric device is mounted on a printed circuit board etc., flux employed in connection with a soldering operation may enter the case through the opening formed therein to exert bad influences on the characteristics of the rotary electric device. Further, for improving the operation of the device and reducing mass production costs, it is desired to pass all of electric or electronic components through a molten solder tank to simultaneously solder a plurality of electric or electronic components on the printed circuit board, etc. In such a case, however, the solder inevitably enters the rotary electric device through the opening formed in the case to disadvantageously influence the rotor means and stator means etc., and as the result, for example, rotation of the rotor means might be prevented and characteristics of a dielectric member or resistance film serving as the stator means might be degraded. Thus, it has generally been necessary to solder the rotary electric device such as a trimmer capacitor onto the circuit board after the board has been passed through the molten solder tank.

To avoid this problem, there has been provided the so-called closed type rotary electric device to which a cover sheet is applied to close an opening defined in its case so as to prevent flux employed in soldering and solder in employment of a molten solder tank from entering the case of the rotary electric device. Such a closed type rotary electric device is disclosed in, for example, Japanese patent laying-open gazette No. 72353/1983 by the inventor et al., which is in the structure as shown in FIGS. 1 and 2.

Figure 1:
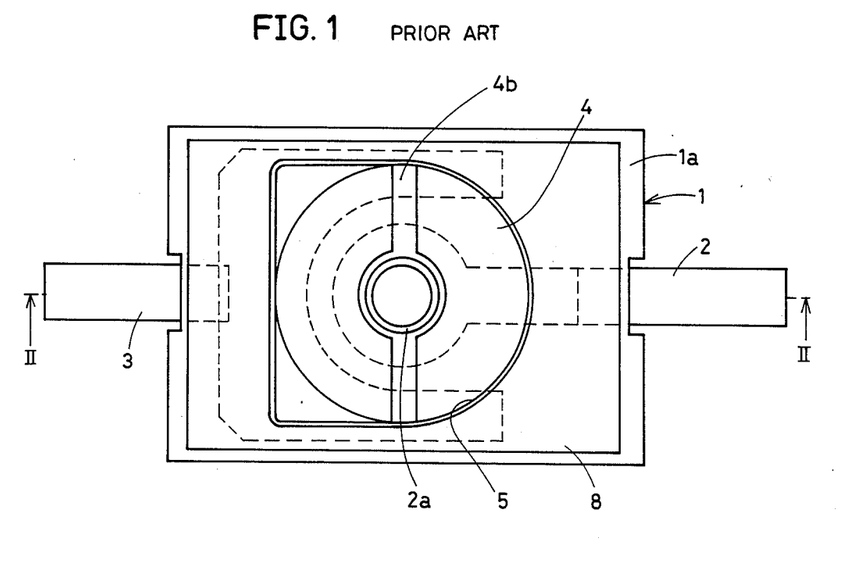
FIG. 1 is a plan view showing a trimmer capacitor or prior art.
Figure 2:
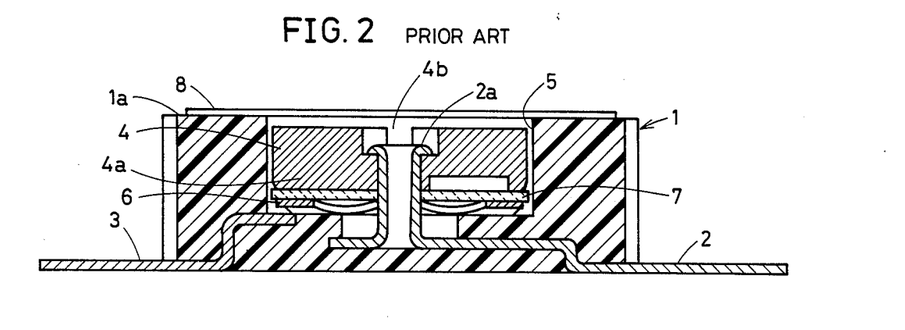
FIG. 2 is a cross-sectional view taken along the line II—II in FIG. 1.

FIGS. 1 and 2 show a prior art trimmer capacitor. FIG. 1 is a plan view and FIG. 2 is a cross-sectional view taken along the line II—II in FIG. 1.

A case 1 of the trimmer capacitor is formed with two terminals 2 and 3 embedded therein. The case 1 is preferably made of material resistant to solder melting temperatures, such as heat-resistant thermosetting resin which is resistant to a temperature of about 300° C. An end of the terminal 2 located within the case 1 is in the form of a throttle grommet 2a, which provides a center shaft for rotatably supporting a rotor 4. An end of the other terminal 3 located within the case 1 is so provided as to be partially exposed from the bottom surface of the case 1. The terminals 2 and 3 are respectively extracted outwardly from the case 1.

The case 1 has an opening 5 and contains a rotary mechanism portion located within the opening 5. The rotary electric device as shown in FIGS. 1 and 2 is a trimmer capacitor, and the rotary mechanism portion is formed by a spring 6, a dielectric member 7 and a rotor 4 successively located from the bottom in FIG. 2. The spring 6 is so arranged as to be electrically connected with the exposed end of the terminal 3, and is ring-shaped in plan view. The dielectric member 7 positioned stationarily on the upper surface of the ring-shaped spring 6 is provided in its lower surface with a semicircular electrode conductor, which is in contact with the spring 6. The dielectric member 7 is contained in the case 1 in a state which prevents it from rotating. The rotor 4, which is in contact with the upper surface of the dielectric member 7, is integrally provided in its lower surface with a semicircular rotor electrode 4a. The throttle grommet 2a passes through the central portion of the rotor 4 to rotatably retain the rotor 4 while the upper end thereof is caulked to retain the spring 6, the dielectric member 7 and the rotor 4 within the case 1. The rotor 4 is provided in its upper surface with an adjusting groove 4b, into which a tool such as a screwdriver may be placed rotate the rotor 4. Upon such rotation of the rotor 4, the area of opposition between the rotor electrode 4a and the electrode conductor provided in the lower surface of the dielectric member 7 is changed to vary the capacitance of the device.

A cover sheet 8 made of, e.g., polyimide resin is attached to an end surface 1a of the case 1 in which the opening 5 is defined. The cover sheet 8 is illustrated as being transparent in FIG. 1 to permit viewing of the interior of the case 1. It is to be noted that the cover sheet 8 may as a practical matter be transparent. The cover sheet 8 is made of heat-resistant material which is resistant to, e.g., a temperature of about 300° C. Further, the cover sheet 8 is preferably formed by material having such thickness and strength that it can be easily broken by a tool such as a screwdriver, so that the capacitance of the device is readily controlled using breaking the cover sheet 8 by the screwdriver, etc. The cover sheet 8 is attached to the end surface 1a of the case 1 by a heat-resistant adhesive such as an epoxy adhesive. The cover sheet 8 may be attached to the end surface 1a of the case 1 by various means such as adhesion.

While the rotary electric device described above is somewhat satisfactory, it exhibits the following problems. When the rotor 4 is rotated, the cover sheet 8 is irregularly broken whereby fragments of the broken cover sheet 8 may be scattered. Such scattering of the cover sheet fragments causes dust to enter the rotary electric device upon breaking of the cover sheet 8. Further, the fragments of the cover sheet 8 may cause significant circuit fault when they are scattered on other circuits arranged in the vicinity of the rotary electric device.

SUMMARY OF THE INVENTION

Accordingly, an object of the present invention is to provide structure of the so-called closed type rotary electric device which can overcome the aforementioned disadvantages of the prior art.

The present invention is characterized in that a cover sheet is formed to be bonded to both of a case of a rotary electric device and rotor means contained therein so as to cover a clearance defined between the edge of an opening defined in the case and the rotor means.

According to the present invention, the cover sheet is formed in a state bonded to both the case and the rotor means, and hence the cover sheet is broken necessarily in a region between the edge of the opening defined in the case and the rotor means when the cover sheet is structured to be broken upon rotation of the rotor means, whereby the portion to be broken is rendered substantially invariable (i.e. the area being broken is well controlled). Further, parts of the broken cover sheet are retained by the case and the rotor means, respectively. Therefore, no wide clearance is defined at the broken portion of the cover sheet upon breaking, and thus the rotary electric device is moderately protected against dust entering the device. Further, no fragments of the broken cover sheet are scattered around to disadvantageously influence the rotary electric device itself and other circuits provided in the vicinity thereof. It is a matter of course that closeness of the rotary electric device is maintained as ever.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
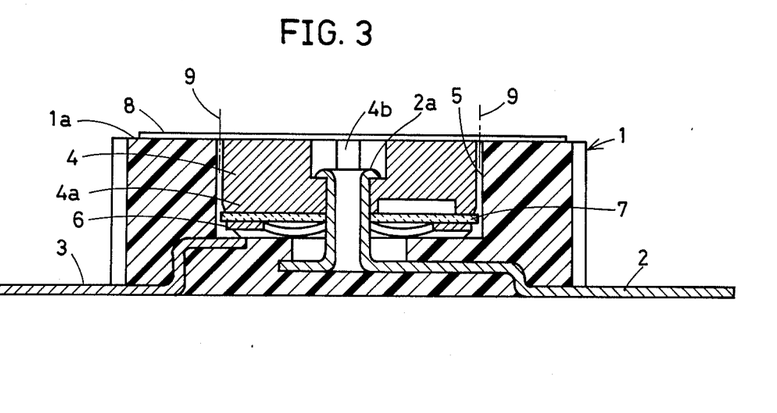
FIG. 3 is a cross-sectional view which is similar to FIG. 2, showing a trimmer capacitor according to a first embodiment of the present invention.

FIG. 3 shows a first embodiment of the present invention. The structure of FIG. 3 defines an improvement, according to the present invention, over the prior art trimmer capacitor shown in FIGS. 1 and 2. Therefore, the feature of the present invention may be clearly understood by comparing FIGS. 3 and 2.

In the structure of FIG. 3, the upper surface of a rotor 4 is rendered to be flush with an end surface 1a of a case 1, whereby a cover sheet 8 is bonded to both the rotor 4 and to the end surface 1a of the case 1. The remaining construction of the trimmer capacitor of in FIG. 3 is substantially identical to that of the trimmer capacitor of FIG. 2, and hence explanation is omitted with respect to identical or corresponding components which are indicated by the same reference numerals.

According to the embodiment shown in FIG. 3, a breaking line appears at a position indicated by numeral 9 upon rotation of the rotor 4.

Figure 4:
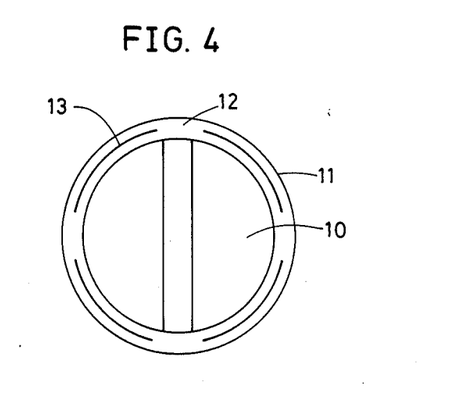
FIG. 4 is an illustration for explaining a second embodiment of the present invention, roughly showing relation between a rotor 10 and an opening 11.

FIG. 4 is a plan view schematically showing relation between a rotor 10 and an opening 11 defined in a case, for illustrating a second embodiment of the present invention. A clearance defined between the rotor 10 and the edge of the opening 11 is covered by a cover sheet 12. In the present embodiment, the cover sheet 12 is provided with a plurality of discontinuous slits 13. When the rotor 10 is rotated, the cover sheet 12 is readily broken at positions along the slits 13. If there is concern that liquid tightness of the rotary electric device is reduced by provision of the slits 13, the cover sheet 12 may be coated by an appropriate adhesive to infiltrate the slits 13. Further, the slits 13 may be replaced by grooves which are defined by continuous or discontinuous thin portions not passing through the cover sheet 12.

Figure 5:
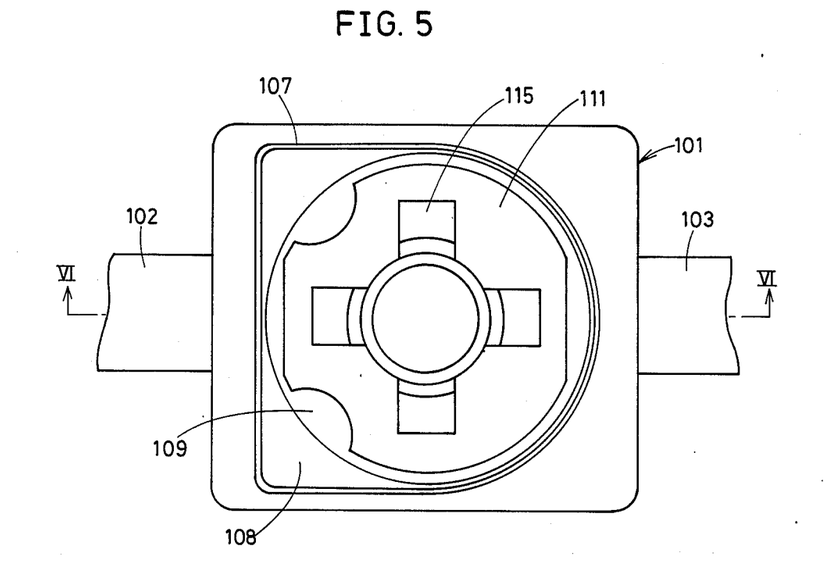
FIG. 5 is a plan view of a trimmer capacitor according to a third embodiment of the present invention.
Figure 6:
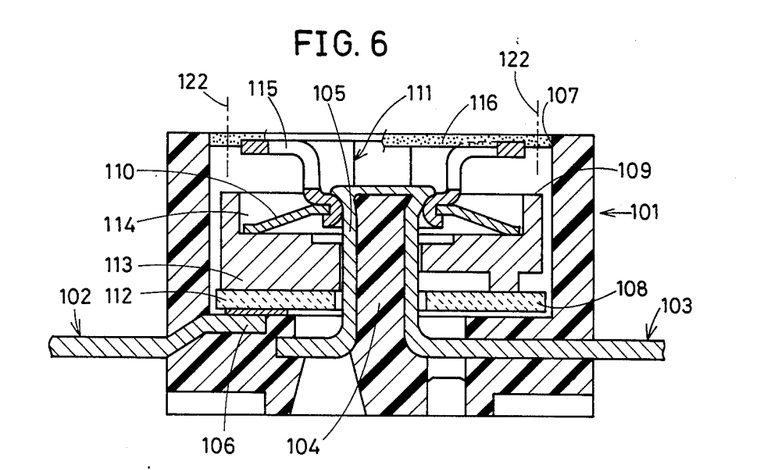
FIG. 6 is a cross-sectional view taken along the line VI—VI in FIG. 5.

FIGS. 5 and 6 show a trimmer capacitor according to a third embodiment of the present invention. FIG. 5 is a plan view and FIG. 6 is a cross-sectional view taken along the line VI—VI in FIG. 5.

A case 101 of the trimmer capacitor is formed with two terminals 102 and 103 embedded therein. The case 101 is made of material resistant to solder melting temperature, such as heat-resistant thermosetting resin which is resistant to a temperature of about 300° C. The end of the terminal 103 located in the case 101 is shaped to receive a center shaft 104 to form a cylindrical portion 105 defining a cylindrical outer peripheral surface around the center shaft 104. The center shaft 104 is formed by filling up the cylindrical portion 105 with resin when the terminal 103 including the cylindrical portion 105 is integrally molded with the case 101. An end 106 of the terminal 102 located in the case 101 is so provided as to be partially exposed from the bottom surface of the case 101. The terminals 102 and 103 are respectively extracted outwardly from the case 101.

The case 101 has an opening 107 and contains a rotary mechanism portion within the same under the opening 107. The rotary electric device shown in FIGS. 5 and 6 is a trimmer capacitor, and hence the rotary mechanism portion is formed by a dielectric member 108 serving as a stator and a metal rotor 109, a spring 110 and a driver plate 111 forming parts of a rotor respectively, successively located from the bottom in FIG. 6. The dielectric plate 108 is stationarily positioned in the case 101 and is provided in its lower surface with a substantially semicircular electrode conductor 112 which is in contact with the terminal 102. The metal rotor 109 has a rotor electrode 113 which is opposed to the electrode conductor 112 through the dielectric plate 108 such that the area of opposition to the electrode conductor 112 is changed by rotation of the metal rotor 109. The metal rotor 109 is provided in its upper surface with a groove 114 for receiving the spring 110, thereby to prevent rotation of the same with respect to the metal rotor 109. The driver plate 111 is caulked in its lower end to be mechanically fixed to the spring 110. The driver plate 111 is provided with an adjusting groove 115 which is generally in the form of a cross as clearly shown in FIG. 5.

In the present embodiment, a cover sheet 116 characterizing the present invention is provided in a state bonded to the inner peripheral surface of the opening 107 defined in the case 101 while the same fills up a part of the driver plate 111 partially forming the rotor and bonded thereto as shown in FIG. 6. The cover sheet 116 is not shown in FIG. 5 to permit viewing of the interior of the case 101.

The cover sheet 116 is preferably formed by a thermosetting silicone adhesive having heat resistance against solder melting temperatures (e.g., resistant to immersion in a molten solder tank at a temperature of 270° C. for 20 seconds), proper elasticity and excellent adhesive strength, respectively after hardening. Such thermosetting resin is employed for efficiently advancing steps of forming the cover sheet as hereinafter described. Within the group of thermosetting resin, further, the hardening process of a hot setting adhesive can be more readily time-controlled in comparison with that of a room temperature setting adhesive, whereby the time loss is reduced.

One method of forming the cover sheet 16 will now be described with reference to FIGS. 7 to 10.

Figure 7:
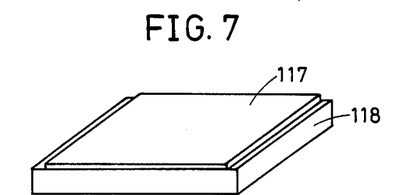
FIGS. 7 to 10 are illustrations successively showing steps of forming a cover sheet 116 as shown in FIG. 6.

FIG. 7 shows a step of forming a film. A film 117 is extended in even thickness on a base plate 118 whose flatness is lower than 0.05 by, e.g., a double-fluid thermosetting silicone adhesive. The base plate 118 may or may not be provided in the form of a flexible sheet. The film 117 must hold its form so that its thickness etc. is not changed before hardening, and hence the same is made of material having high viscosity of, e.g., about 10000 to 400000 cps. The thickness of the film 117 is selected to be about 0.05 to 0.5 mm although the value can be changed as desired. Such thickness is related to extension strength and breaking strength of the cover sheet 116 as hereinafter described, and is appropriately adjusted to obtain desired extension strength and breaking strength. The base plate 118 is prevented from adhesion with the film 117 at least in its surface which is in contact with the film 117. For example, the base plate 118 itself is made of or coated with Teflon (trade name).

Figure 8:
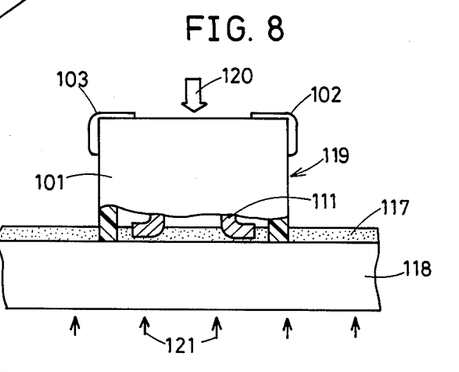
Figure 9:
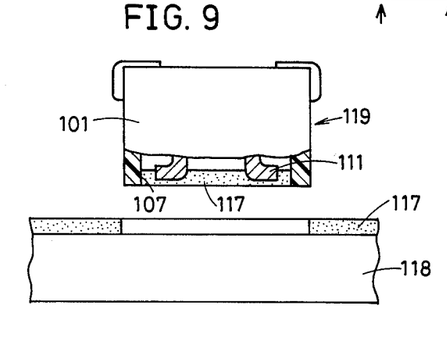
Figure 10:
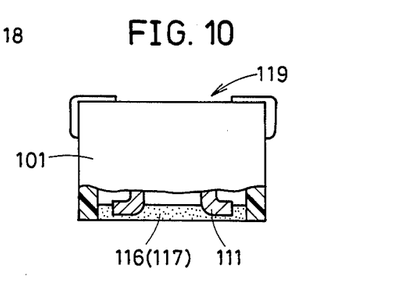

Then, a pressing step is performed as shown in FIG. 8. A rotary electric device 119 such as a trimmer capacitor is placed on the film 117 with the opening 107 of the case 101 facing the film 117. The rotary electric device 119 shown in FIGS. 8 to 10 is the trimmer capacitor illustrated in FIGS. 5 and 6. The case 101 is partially fragmented as is a part of the driver plate 111. The drawings are modified to some extent in size to make it easier to understand the respective steps of the process. Shown in the upper portion of the case 101 are the terminals 102 and 103, which are bent downwardly relative to the state shown in FIG. 6 along the case 101 in the form of chips. In the state illustrated in FIG. 8, the film 117 is still unhardened. Therefore, when pressure (indicated by arrow 120) is applied to the bottom side of the case 101, the edge portion of the opening 107 intrudes into the film 117, which in turn is partially brought into contact with the inner peripheral surface of the edge portion of the opening 107. Thus, the resin material is introduced into the opening 107 to form the cover sheet which closes the opening 107. In the present embodiment, sufficient pressure is applied to the case 101 to cause the edge portion of the opening 107 to be brought into contact with the base plate 118 and thereby sever the film 117. Within the case 101, the driver plate 111 is partially in contact with or embedded in the film 117. To this end, the upper surface of the driver plate 111 is preferably positioned to be lower than that of the case 101 by about 0.05 to 0.1 mm.

When the step shown in FIG. 8 is performed, the base plate 118 is simultaneously heated as indicated by arrows 121. The heating condition depends on the material forming the film 117, and in case of, e.g., a silicone adhesive, the base plate 118 is heated at a temperature of 130° to 150° C. When the state as shown in FIG. 8 is maintained under such heating condition, the resin forming the film 117 begins to be hardened. The base plate 118 is heated until the resin forming the film 117 half-hardens, i.e., the heating operation is stopped in a state that the adhesive strength of the resin is not yet sufficient, and thereafter the base plate 118 is temporarily cooled. For example, such a half-hardened state of the resin is obtained by heating at a temperature of 130° C. for four minutes when the film 117 is formed by a hot setting silicone adhesive.

Then a separation step is performed as shown in FIG. 9 by separating the rotary electric device 119 from the base plate 118. Consequently, a portion of the film 117 for forming the cover sheet is separated from the base plate 118 with the case 101. The other portion of the film 117 which is in contact with the outer peripheral surface of the case 101 is readily separated from the case 101 since its adhesive strength is not yet sufficient, and hence the aforementioned portion of the film 117 alone is now in contact with the rotary electric device 117. Thus, simultaneously performed during this separation step is a removing step for removing the unnecessary portion of the film 117 in the outer peripheral portion of the edge of the opening 107.

Then a subsequent step is performed as shown in FIG. 10 for hardening the film 117 introduced into the opening 107 of the case 101. In this step, the film 117 is heated to be completely hardened, whereby the cover sheet 116 is formed in a state bonded to the inner peripheral surface of the edge portion of the opening 107 in the case 101. Thus, the rotary electric device 119 is obtained in the form closed by the cover sheet 116.

In the aforementioned embodiment, silicone adhesive is employed as the material for the cover sheet 116. Therefore, the cover sheet 116 itself has elasticity to permit insertion of a screwdriver etc. into the driver plate 111 with, e.g., a load smaller than 50 g. The thickness of the cover sheet 116 is about 0.05 to 0.5 mm, and when the driver plate 111 is rotated by the screwdriver, the cover sheet 116 is readily broken between the inner peripheral surface of the case 101 and the outer peripheral surface of the driver plate 111 as indicated at 122 in FIG. 6 without requiring high torque. For example, the cover sheet 116 can be broken with torque lower than 150 g cm. Further, even if the break line is formed in the position shown by numeral 122 (FIG. 6), no wide clearance is defined since most of the cover sheet 116 is retained by the driver plate 111, whereby the rotary electric device 119 is protected from dust after adjustment. The silicone adhesive may be prepared by single-fluid room temperature setting resin.

Although the cover sheet 116 is normally broken during the foregoing adjustment step, it may be merely extended or partially broken. The actual change in the cover sheet 116 by the adjusting operation depends on factors such as the material for the cover sheet 116 and the thickness thereof.

Figure 11:
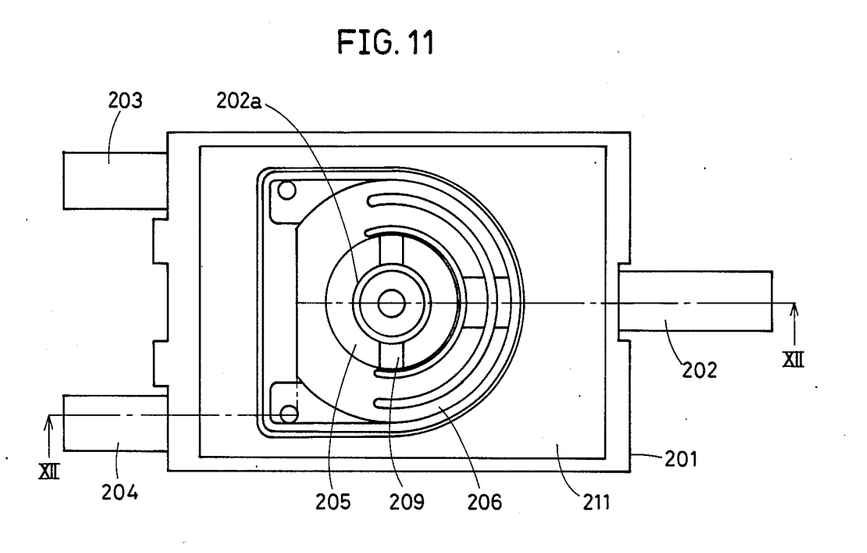
FIG. 11 is a plan view of a variable resistor according to a fourth embodiment of the present invention.
Figure 12:
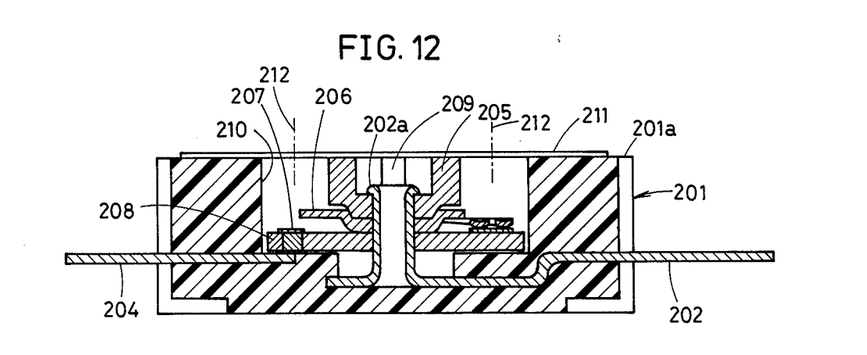
FIG. 12 is a cross-sectional view taken along the line XII—XII in FIG. 11.

FIGS. 11 and 12 show a variable resistor according to a fourth embodiment of the present invention. FIG. 11 is a plan view and FIG. 12 is a cross-sectional view taken along the line XII—XII in FIG. 11.

A case 201 of heat-resistant resin is formed with three terminals 202, 203 and 204 embedded therein. An end of the terminal 202 located in the case 201 is provided in the form of a throttle grommet 202a, to provide an axis of rotation for a rotor 205 and a slider 206. The ends of the other two terminals 203 and 204 located in the case 201 are partially exposed on the bottom surface of the case 201. A stator 208 having a resistance film 207 connected to both of the terminals 203 and 204 is placed on the bottom of the case 201. The slider 206 and the rotor 205 are successively placed on the stator 208, and the upper end of the throttle grommet 202a is caulked thereby to retain the components in play. The terminals 202 to 204 may be cut in appropriate length and bent downwardly along the case 201, thereby to render the variable resistor in the form of a chip.

A screwdriver or other tool is engaged in an adjusting groove 209 defined in the upper surface of the rotor 205, to rotate the rotor 205 thereby changing the resistance value of the device.

In the present embodiment, the upper end surface of the rotor 205 is flush with the upper end surface 201a of the case 201, so that the cover sheet 211 for closing the opening 210 defined in the case 201 is bonded also to the upper end surface of the rotor 205 similarly to the embodiment as shown in FIG. 3.

When torque is applied to the rotor 205, the cover sheet 211 is readily broken along a breaking line as indicated by numeral 212 in FIG. 12.

The cover sheet 211 as shown in FIGS. 11 and 12 may be formed by the method as shown in FIGS. 7 to 10.

According to the present invention as hereinabove described with reference to the preferred embodiments, the cover sheets 12, 116 and 211 and the cases 1, 101 and 201 are made of resin which is resistant to solder melting temperatures, and therefore the rotary electric devices can be passed through molten solder tanks.

In the respective embodiments, further, the cover sheets 12, 116 and 211 provide flat surfaces in the upper portions of the rotary electric devices, and thus the present invention can be applied by an automatic mounting device to a circuit substrate utilizing vacuum suction etc. However, if such an advantage is not desired, the rotor may be formed to project from a portion in the end surface of the opening defined in the case so that the cover sheet simply covers the clearance defined between the edge of the opening and the rotor.

Although the cases, 1, 101 and 201 in the aforementioned embodiments are formed with the terminals 2, 3, 102, 103 and 202 to 204 embedded therein, the present invention may be applied to structure in which terminals are assembled into a case after forming with clearances filled up with an adhesive, while terminals may simply be inserted under pressure into holes defined in the case if circumstances require.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electric device, comprising:
  a case having an opening formed therein;
  a rotary mechanism located in said opening and including a rotor and a stator, said rotor being so located in said opening that there is a clearance defined between an outer periphery of said rotor and an inner periphery of said opening; and
  a breakable cover sheet which covers said clearance and is bonded to both said case and said rotor.

2. An electric device in accordance with claim 1, wherein said cover sheet is readily broken at a portion located adjacent said clearance by rotation of said rotor.

3. An electric device in accordance with claim 2, wherein said cover sheet and said rotor are so arranged that when said cover sheet is oriented in a horizontal plane above said stator and said cover sheet is broken by rotation of said rotor, broken and separated parts of said cover sheets are retained between said case and said rotor.

4. An electric device in accordance with claim 1, wherein said cover sheet is bonded to said case and said rotor by an adhesive.

5. An electric device in accordance with claim 4, wherein means are formed in said cover sheet to enable ready breaking along said means.

6. An electric device in accordance with claim 5, wherein said means is defined by slits formed in said cover sheet.

7. An electric device in accordance with claim 5, wherein said means is defined by grooves formed in said cover sheet.

8. An electric device in accordance with claim 4, wherein said opening in said case extends to a side of said case which is generally planar and wherein said rotor has a top surface which is also generally planar and is co-planar with said side of said case.

9. An electric device in accordance with claim 1, wherein said cover sheet is formed of an adhesive material.

10. An electric device in accordance with claim 9, wherein said cover sheet is bonded to said inner periphery of said opening.

11. An electric device in accordance with claim 10, wherein said opening terminates at an outer edge of said case and wherein said edge is positioned higher than the top surface of said rotor.

12. An electric device in accordance with claim 9, wherein said cover sheet is formed of a thermosetting resin.

13. An electric device in accordance with claim 12, wherein said thermosetting resin is a silicone adhesive.

14. An electric device in accordance with claim 13, wherein said silicone adhesive is of a hot setting type.

15. An electric device in accordance with claim 13, wherein said silicone adhesive is of a room temperature setting type.

16. An electric device in accordance with claim 1, further including at least two terminals electrically communicating with said rotor and said stator, respectively, said terminals being integrally moded with said case.

17. An electric device in accordance with claim 1, wherein said electric device is a trimmer capacitor.

18. An electric device in accordance with claim 1, wherein said electric device is a variable resistor.

19. An electric device in accordance with claim 1, further including a tool receiving recess formed in said rotor.

20. An electric device in accordance with claim 1, wherein said case, said rotor and said cover sheet cooperate to define a fluid tight chamber in which said stator and rotor are located.

21. An electric device comprising:
  a case and an opening through the case;
  a stationary electrical component in the case;
  a rotatable component coupled to the stationary component and operable for changing at least one electrical parameter associated with said device, said rotatable component being exteriorly accessible through said opening, and a clearance being defined between said rotatable component and an edge portion of said case defining said opening; and a cover sheet affixed to said rotatable component and to an inner peripheral surface of said edge portion which defines said opening to thereby cover said clearance;

said cover sheet being formed of a material having elastic and heat resisting properties.

22. An electric device comprising a rotary mechanism portion including rotor means and stator means contained in a case having an opening for receiving a tool for rotating said rotor means, a clearance being defined between said rotor means and an edge portion defining said opening;

said electric device including a cover sheet which is bonded to said rotor means, and to an inner peripheral surface of said edge portion which defines said opening for covering said clearance; and said cover sheet being formed of a material having elastic and heat resisting properties.

23. An electric device comprising:

a case and an opening through the case;

a stationary electrical component in the case;

a rotatable component coupled to the stationary component and operable for changing at least one electrical parameter associated with said device, said rotatable component being exteriorly accessible through said opening, and a clearance being defined between said rotatable component and an edge portion of said case defining said opening; and a cover sheet affixed to said rotatable component and to an inner peripheral surface of said edge portion which defines said opening to thereby cover said clearance;

said cover sheet being easily breakable.

* * * * *